United States Patent Office 3,505,524
Patented Apr. 7, 1970

3,505,524
METHOD AND AN ARRANGEMENT FOR MEASURING AND RECORDING THE ABSORPTION OF ELECTROMAGNETIC RADIATION
Vilhelm E. S. Hjerten, Uppsala, Sweden, assignor to Incentive Research & Development AB, Bromma, Sweden, a limited company of Sweden
Filed Dec. 15, 1966, Ser. No. 601,963
Claims priority, application Sweden, Dec. 22, 1965, 16,626/65
Int. Cl. G01t 1/16
U.S. Cl. 250—83.3      14 Claims

ABSTRACT OF THE DISCLOSURE

A method and apparatus for analyzing a substance by detecting its absorption of electromagnetic radiation, particularly ultraviolet radiation in which the radiation is passed through a moveable filter which alternately transmits radiation pulses of at least two mutually exclusive, different frequencies, a first of which is at least partially absorbed by the sample substance and a second of which is substantially unabsorbed by the sample substance, either before or after passage of the electromagnetic radiation through the sample substance; the radiation is converted into corresponding electrical pulses after passage of the radiation through the filter and the sample substance; the electrical pulses are separated into groups of pulses including pulses of the first frequency and pulses of the second frequency; and a quotient of the amplitudes of the two groups of pulses is formed and the quotient is recorded. The sample may be rotated or reciprocated during passage of the radiation therethrough.

---

The present invention relates to a method for measuring and recording the absorption of electromagnetic radiation, e.g. in the ultraviolet range. The invention does also concern an arrangement for carrying out the method.

The presence and/or the concentration of a substance in e.g. a liquid can be detected by use of a photometrical method of analysis based on the fact that the absorption of electromagnetic radiation in the substance is different at different frequencies. The amount of absorption does, of course, also vary in response to variations in the concentration of the substance. However, the photometrical methods so far used yield results which are very difficult to interpret. The cause of those difficulties could be e.g. variation in the intensity of the radiation source or contamination of the surfaces through which the radiation passes.

The object of this invention is to provide a method and an arrangement for photometrical analysis in which the above-mentioned limitations and drawbacks have been effectively eliminated.

According ot the main characteristic of the invention the electromagnetic radiation is caused, before or after the passage through the substance of sampled body in question, to pass through a movable filter alternatingly transmitting radiation pulses of at least two different freqeuncies. If two frequencies $f_1$ and $f_2$ are used, they should be selected in such a manner that the radiation having the frequency $f_1$ is entirely or partially absorbed in the substance whereas the radiation of frequency $f_2$ is substantially not at all affected thereby. The radiation pulses thus formed by the movable filter are then converted into electric pulses which are supplied to a recorder forming the quotient between the amplitudes of the two groups of pulses, corresponding to frequencies $f_1$ and $f_2$. If those amplitudes are varied by the same relative amount—e.g. in response to variations in the total intensity of the radiation source—the quotient will remain constant so that the detector indicates zero.

In order to obtain a simple sampling of the entire sampled body which might be constituted by a rotating tube the latter may be given a reciprocating movement across the beam defining the passage of the radiation. Another advantage of moving the sampled body through the beam instead of vice versa is that the radiation source and the radiation detector are not subjected to any vibrations.

An arrangement for carrying out the method according to the invention is characterized by comprising the following elements arranged in series along the trajectory of the beam: a movable filter for chopping the beam into a series of radiation pulses exhibiting at least two different frequencies, a sampled body, a radiation detector, a device for separating the pulses derived from the radiation detector and a recorder for forming the quotient above referred to.

Figure 1:
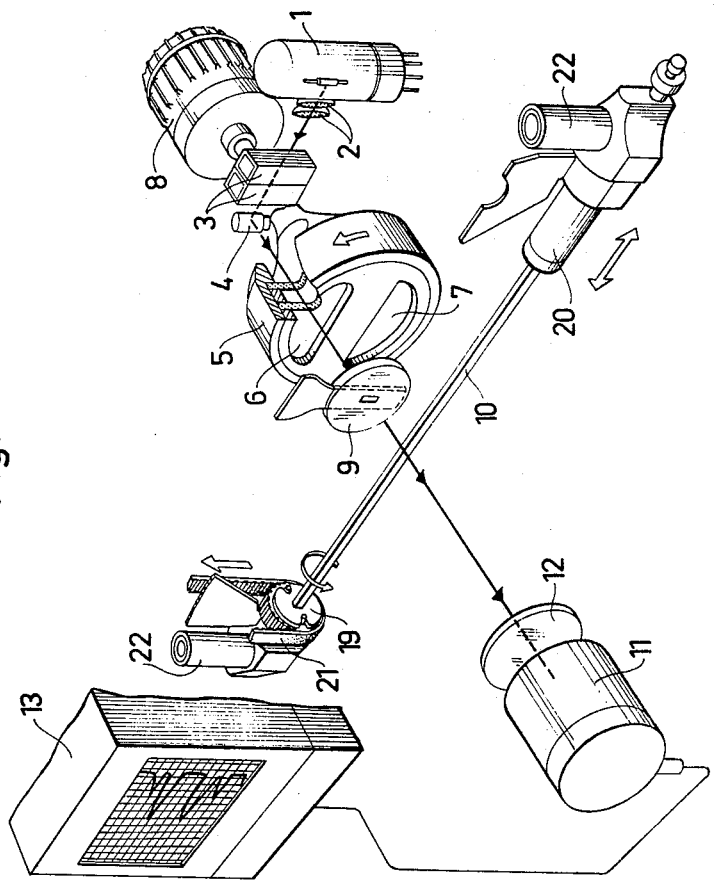
Figure 2:
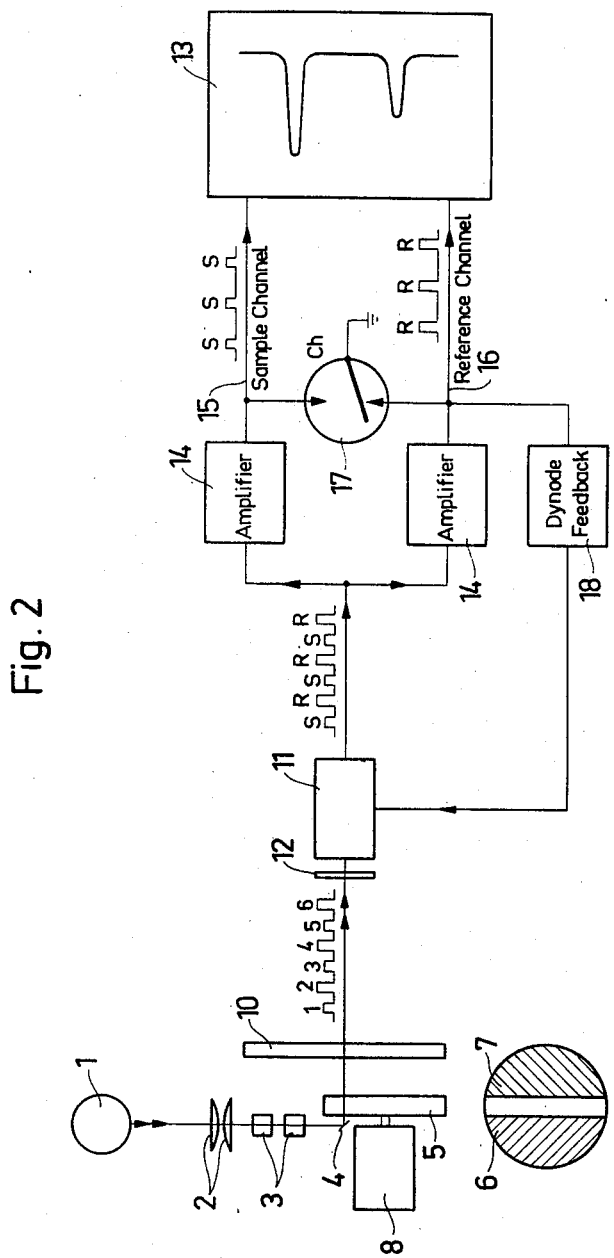

An embodiment of the invention will now be described in greater detail reference being made to the accompanying drawing in which FIGURE 1 is a perspective view of a device for carrying out the method and FIGURE 2 illustrates a circuit diagram relating to the same device.

A hydrogen lamp 1 emits radiation within the ultraviolet spectrum which is focused by means of a system 2 of lenses into a bundle of parallel beams which afterwards pass through a liquid filter 3. By means of a metallic mirror 4 the radiation is deflected by 90° whereupon the ray is chopped by the use of a rotating filter 5 consisting of two halves 6 and 7 and driven by an electrical synchron motor 8. A diagphragm 9 gives the beam the desired cross-section, which according to the present embodiment is rectangular. The beam is then caused to pass through a sampled body 10 constituted by a rotating electrofores tube containing zones of the substances to be analyzed. As appears from the arrows on the drawing, the tube is imparted a rotating movement and also a reciprocating movement in the radiation beam. The object of the rotating movement is to prevent distortion of the sample zones due to convection currents generated on account of the fact that the sample has a density deviating from that of the surrounding solution. According to the invention the apparatus and the source of radiation are stationary whereas the sample is moved relatively the beam. In certain applications it is suitable to use instead of the rotating electrofores tube a stationary through-flow cuvet.

The tube is at its ends mounted for rotational movement in supports 19 and 20 respectively. One of those supports comprises a toothed wheel in driving engagement with a belt 21. Supports 19 and 20 do also comprise means 22 for supplying an electrical voltage over the ends of the tube.

Before the beam reaches a photomultiplicator 11 it passes a filter 12 removing light within the visible spectrum. The radiation pulses are in the photomultiplicator converted into electrical pulses and afterwards fed to a quotient-forming recorder 13 recording directly the relative amount of absorption of the ultraviolet radiation in the sampled body.

The operation of the device will now be explained, reference being made to the circuit diagram shown in FIGURE 2.

When passing through the rotating filter composed of two halves 6 and 7 the beam is chopped into a series of radiation pulses. The transmission characteristics of filters 3, 6, 7 and 12 are selected in such a manner that the transmission of those pulses reaches its maximum about the frequencies $f_1$ (corresponding to the wave length 2800

Angström units) and $f_2$ (corresponding to wave length 3100 Angström units), respectively. Those frequencies have been selected in such a way that the substance under analyzis absorbs radiation having the frequency $f_1$ but not radiation of frequency $f_2$. Accordingly, if the beam has passed through the substance a certain absorption of the radiation having the frequency $f_1$ has occurred which involves that the amplitude of those radiation pulses is reduced in comparison to the amplitude of the $f_2$ radiation pulses. This appears from FIGURE 2 showing a series of radiation pulses which have passed through the sampled body and which are given numbers 1 to 6. Pulses 1, 3, 5 . . . correspond to radiation of frequency $f_1$ whereas pulses 2, 4, 6, . . . correspond to $f_2$ radiation. After the passage through the photomultiplicator the pulses are converted into corresponding voltage pulses which have been given reference numerals S (sample) and R (reference), respectively. The electrical pulses are then via amplifiers 14 supplied to two channels 15 and 16. Between those channels there is a mechanical switch 17 alternatingly connecting one of the two channels to ground. The switch operates synchronized with the motor 8 so that pulses S and R are separated whereupon they are fed to their respective inputs of the quotient-forming recorder 13. In this unit the quotient between the amplitudes of the pulses S and R is formed. Due to the fact that the amplitude of pulses S is dependent of the amount of absorption of $f_1$ radiation in the sampled body, whereas the pulses R are not affected by any absorption, any change in the quotient S/R will entirely due its existence to amplitude variations in respect of the S pulses. This means that the indication of the recorder is proportional to the transmission of the radiation having the frequency $f_1$.

The advantage of measuring and recording the quotient between the amplitudes S and R corresponding to the two frequencies $f_1$ and $f_2$ resides in that the recorder is not affected by any disturbances which might change the intensity of the radiation at those frequencies in the same relative amount. Such disturbances can be constituted by variations in the voltage over the hydrogen lamp, by irregularities in the electrofores tube or by contaminations on the surface thereof and do accordingly not influence the accuracy of their result. Since reflexion, transmission, refraction and absorption are dependent of the wave length of radiation it is advantageous that the wave length corresponding to the reference pulses is close to the wave length corresponding to the sample pulse. However, the two wave length values should not be so closely spaced that the sampled body could absorb any of the radiation which is intended to generate the reference pulses. By means of a feeding back device 18 the amplitude of are reference pulses is maintained constant.

I claim:

1. A method for measuring and recording the absorption of electromagnetic radiation by a substance; comprising, placing a moveable filter in the path of said radiation; alternately transmitting through said filter radiation pulses of at least two mutually exclusive, different frequencies, a first of which would be at least partially absorbed by said substance and a second of which would be substantially unabsorbed by said substance; placing said substance in said path of said radiation; detecting said radiation pulses after passage through said substance and said filter and converting the same into corresponding electrical pulses; separating said electrical pulses into two groups, including pulses of said first frequency and pulses of said second frequency; and forming a quotient of the amplitudes of said two groups of electrical pulses and recording the same.

2. A method in accordance with claim 1 wherein the filter is placed in the path of the radiation before said radiation reaches the substance.

3. A method in accordance with claim 1 wherein the filter is placed in the path of the radiation after said radiation passes through the substance.

4. A method in accordance with claim 1 which additionally includes feeding the electrical pulses of the second frequency back to the converting step to maintain a constant amplitude of said pulses of said second frequency.

5. A method in accordance with claim 1 wherein the electromagnetic radiation is ultraviolet radiation.

6. A method in accordance with claim 1 wherein the substance is rotated while the radiation passes therethrough.

7. A method in accordance with claim 1 wherein the substance is reciprocated while the radiation passes therethrough.

8. A method in accordance with claim 1 wherein the first and second frequencies are close to one another.

9. Apparatus for measuring and recording the absorption of electromagnetic radiation by a substance, comprising; a source of electromagnetic radiation; a moveable filter positioned in the path of the radiation emitted by said source and adapted to alternately transmit radiation pulses of at least two mutually exclusive frequencies; means for supporting said substance in said path of said radiation emitted by said source; means for detecting said radiation pulses after passage through said substance and said filter and converting the same to equivalent electrical pulses; means for separating said electrical pulses into two groups including pulses of said first frequency and pulses of said second frequency; and recorder means adapted to form a quotient of the amplitudes of said two groups of pulses and to record the same.

10. Apparatus in accordance with claim 9 wherein the filter is positioned in the path of the radiation before said radiation reaches the substance.

11. Apparatus in accordance with claim 9 wherein the filter is positioned in the path of the radiation after said radiation passes through the substance.

12. Apparatus in accordance with claim 9 in which the means for separating the electrical pulses into two groups includes amplifier means through which said electrical pulses are supplied to the recorder as two inputs; and mechanical switch means between said inputs to said recorder, operating in synchronism with the moveable filter and adapted to alternately ground said inputs to said recorder whereby said electrical pulses are separated into said two groups.

13. Apparatus in accordance with claim 9 wherein the means for supporting the substance includes means for rotating the substance during passage of radiation therethrough.

14. Apparatus in accordance with claim 9 wherein the means for supporting the substance includes means for reciprocating the substance during passage of radiation therethrough.

References Cited

UNITED STATES PATENTS

| | | | |
|---|---|---|---|
| 2,974,226 | 3/1961 | Fisher | 250—83.3 |
| 3,327,119 | 6/1967 | Kamentsky | 250—83.3 |

RALPH G. NILSON, Primary Examiner

D. L. WILLIS, Assistant Examiner

U.S. Cl. X.R.

250—43.5